UNITED STATES PATENT OFFICE.

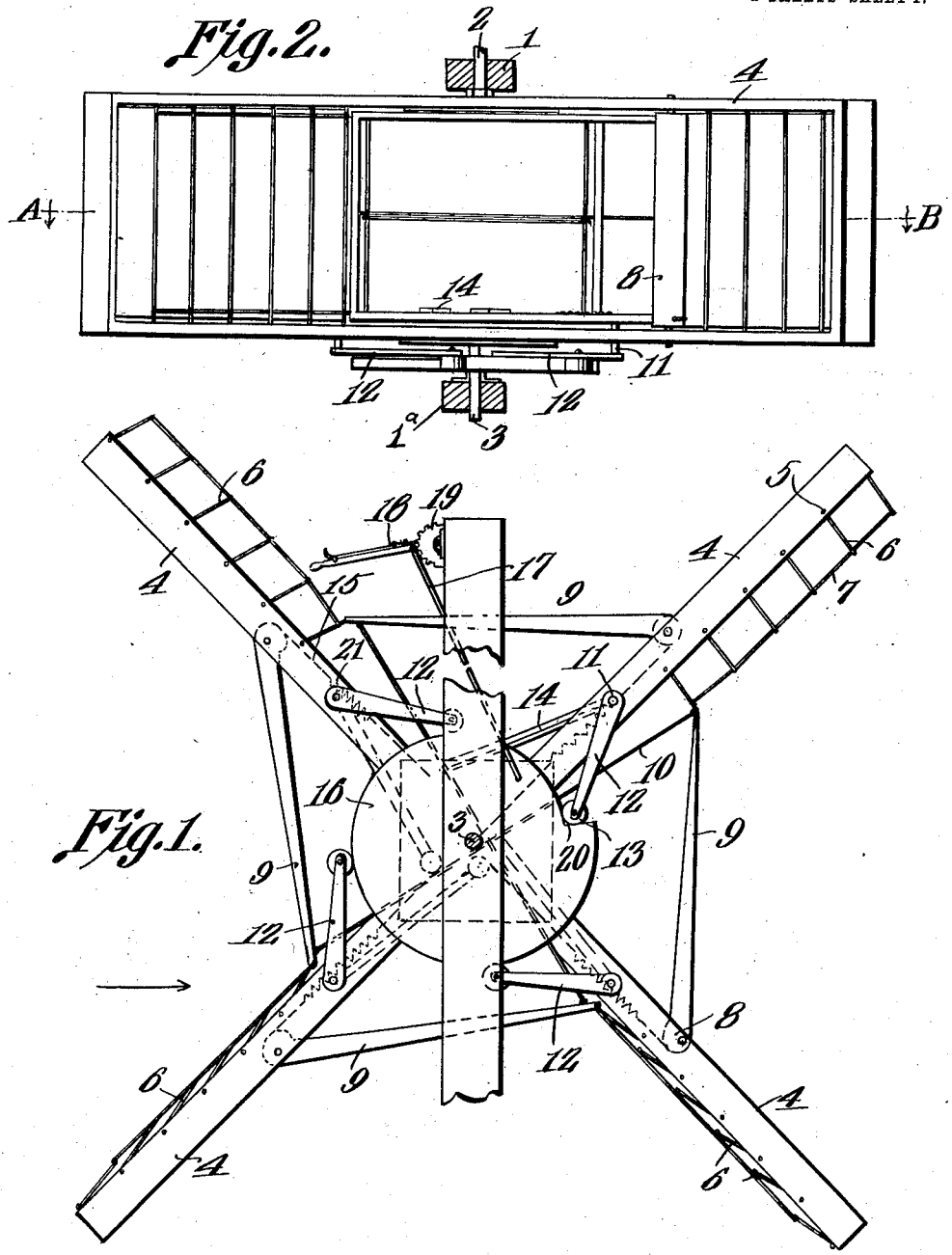

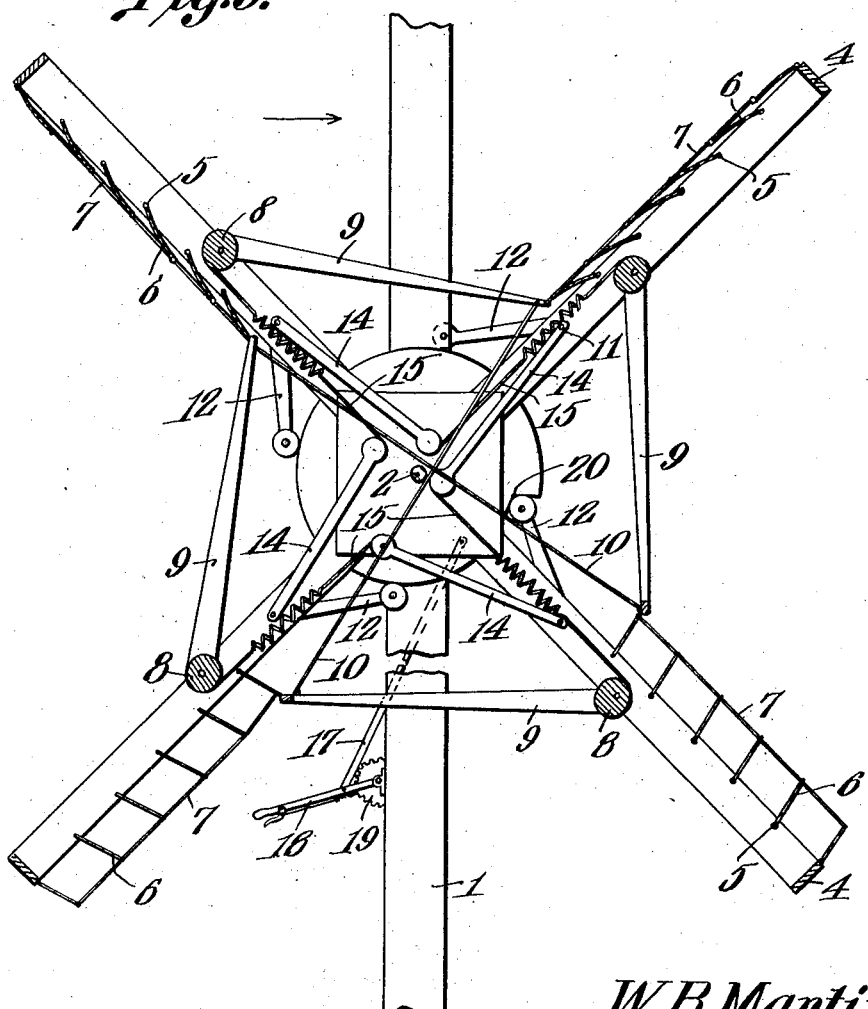

WILLIAM R. MARTIN, OF IDAHO FALLS, IDAHO.

WIND-WHEEL OR PROPELLER.

1,078,157.  Specification of Letters Patent.  Patented Nov. 11, 1913.

Application filed October 25, 1912. Serial No. 727,803.

*To all whom it may concern:*

Be it known that I, WILLIAM R. MARTIN, a citizen of the United States, residing at Idaho Falls, in the county of Bonneville and State of Idaho, have invented a new and useful Wind-Wheel or Propeller, of which the following is a specification.

This invention relates to wind wheels or propellers, its object being to provide a wheel or propeller having feathering wings whereby the wheel, when rotating either in a horizontal or in a vertical plane will operate either to propel an airship or to perform the functions of an ordinary wind wheel such as used for operating pumps and the like.

Another object is to provide simple and compact mechanism whereby the wings of the wheel are automatically shifted to active and to feathering position during the rotation of the wheel.

Another object is to provide means whereby the wings can be caused to shift to active positions at any desired point in the circular path in which they travel.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a bottom plan view of the device arranged to rotate in a horizontal plane. Fig. 2 is a front elevation, thereof, the supporting structure being shown in section. Fig. 3 is a section on line A—B Fig. 2.

Referring to the figures by characters of reference 1 and 1ª designate upper and lower beams respectively constituting part of the supporting structure and in these beams are journaled trunnions 2 and 3 extending from the center of the wheel. The wheel is preferably made up of two similar oblong frames 4 which cross at their centers and are fixedly connected. Each frame is provided, with cross rods 5 on which are hung wings 6 which can be formed of light sheet metal, of heavy fabric, or of any other desired material. Connecting wires 7 or the like are secured to the ends of the free edges of the wings 6 of each series so that, when the wires are pulled inwardly toward the center of the wheel, all of the wings 6 connected to them will be swung inwardly into the frame 4. The wings when thus arranged will lap and present a broad plane or surface.

A block 8 is mounted for rotation within each frame 4 close to the innermost wing 6 in the frame and extending from each block 8 are parallel arms 9 which are secured to the inner ends of the wires 7 connected to the wings 6 on the adjacent frame. These arms 9 all extend in the direction of rotation of the wheel and the outer ends of each pair of arms 9 are connected to the corresponding ends of the opposed arms 9 by means of cables 10 or the like extending within the frames 4. These connections 10 are so proportioned that, when one arm 9 is swung outwardly away from the wheel, the other arm 9 opposed thereto will be drawn inwardly so as to pull taut the wires or connections 7 attached thereto.

A shaft 11 is journaled within each frame 4 close to the innermost wing 6 in the frame and extending from each shaft is a crank arm 12 carrying an anti-friction roller 13. Another arm 14 extends from the inner end of shaft 11 and is connected, by means of a cable 15 or the like, to the block 8 in the frame carrying the shaft 11 of said arm. This cable 15 is attached to the outer surface of the block 8 so that, when arm 14 is swung inwardly toward the center of the wheel, the connection 15 will pull on block 8 and tend to rotate it, thereby causing the arms 9 on said block to swing outwardly and pull, through the connections 10, upon the opposite arms 9. All of the arms 14 are preferably extended in the direction of rotation of the wheel while the arms 12 are extended in the opposite direction. The anti-friction rollers 13 bear upon the periphery of a volute cam 16 which is mounted for rotation upon the trunnion 3. This cam, however, is normally held against rotation by means of a rod 17 which is pivotally connected thereto and to a controlling lever 18 pivotally mounted upon one of the beams 1. Any suitable means such as a toothed segment 19 may be provided for use in securing lever 18 against swinging movement and, consequently, holding the volute cam against rotation.

It will be apparent that during the rotation of the wheel the closed wings 6 will act to displace air, if the wheel is being used as a propeller and will also act to receive the force of air currents if the wheel is being used as an ordinary wind wheel. When the wheel is being used as a propeller it rotates in the direction indicated by the arrows in Figs. 1 and 3 and the closed wings 6 operate to displace air rearwardly. As the frames 4 move into planes parallel or substantially parallel with the line of flight, the rollers 13 moving therewith trip over the shoulder 20 of the cam 16, thus permitting the arms 14, which are shiftable with the rollers 13, to swing outwardly from the center of the wheel. The connection 15 attached to the outwardly swinging arm 14, allows the arm 9 to which it is attached to swing inwardly toward the center of the wheel. This inward swinging movement is produced by the connection 10 which is attached to the free end of the opposed arm 9 which arm is caused to swing outwardly by the connection 15 which is attached to another arm 14, the roller 13 of which is riding upon the periphery of the volute cam and being swung outwardly away from the center of the wheel. Thus it will be seen that as the wheel rotates, the sets of wings 6 are successively shifted to closed or active positions and two adjoining sets are constantly thus arranged so that the said sets will displace air rearwardly and cause the machine to which the propeller is attached to be driven forward. The wings of the opposed sets, being unrestrained, will be free to swing to open position so as to feather and permit air currents to pass between them. By shifting lever 18 rod 17 will cause the volute cam to rotate about its trunnion 3 and thus shift the position of the shoulder 20 so as to change the points in the circular path of the wings where the wings are to be shifted to active positions.

Obviously the wheel can be mounted upon a transverse horizontal axis for the purpose of propelling and, instead of utilizing the wheel as a propeller, it can be employed to receive the force of air currents so as to drive a pump or other mechanism.

In order to compensate for the relative movement of the arms 14 and blocks 8, each connection 15 preferably includes a coiled spring, such as shown at 21 so that it is thus possible for the connection to elongate when necessary to prevent breakage of any parts.

What is claimed is:—

1. A wheel of the class described including radially disposed series of wings, flexible connections between the wings of each series, a stationary cam, pivotally mounted arms for actuating the respective series of wings, connections between opposed arms of the wheel, means engaging and shiftable by the cam, and yielding devices operated by the respective means for actuating the respective arms and shifting the wings.

2. A wheel of the class described including radial series of feathering wings, a pivoted arm connected to each series, a connection between every two opposed arms, a stationary cam, and means engaging and movable upon the cam for successively swinging each arm outwardly to open the wings adjacent thereto and to pull, through its connection, upon the opposed arm, thereby to close the wings adjacent said opposed arm, said means including a yielding element.

3. A wheel of the class described including radial series of feathering wings, a pivoted arm connected to each series, a connection between every two opposed arms, a stationary cam, a shaft mounted for rotation adjacent each series of wings, an arm upon the shaft and bearing against the cam, a second arm upon each shaft, and a yielding connection between said last named arm and the adjacent pivoted arm, said cam, arms and connections operating to successively swing each pivoted arm outwardly to open the wings adjacent thereto and to pull, through the connections between the arms, upon the opposed pivoted arm to close the wings adjacent thereto.

4. A wheel of the class described including radially disposed frames, a series of wings carried by each frame, connections between the wings of each series, an arm pivotally mounted within each frame and connected to the wings in the next adjoining frame, a stationary cam, a connection between each arm and the opposed arm, and means carried by each frame and engaging and movable upon the cam for actuating the arms in adjacent frames, through their connections, to close the wings in the frame of said cam engaging means, said means including a yielding element.

5. A wheel of the class described including connected frames mounted for rotation about a common axis, a series of wings mounted within each frame, connections between the wings of each series, arms pivotally mounted within the frames, connections between opposed arms, shafts journaled within the frames, arms movable therewith, yielding connections between said last named arms and the adjacent pivoted arms, a stationary cam, and arms extending from the shafts and bearing on the cam.

6. A wheel of the class described including connected frames mounted for rotation about a common axis, a series of wings mounted within each frame, connections between the wings of each series, arms pivotally mounted within the frames, connections between opposed arms, shafts journaled within the frames, arms movable therewith, yielding connections between said last named arms and the adjacent pivoted arms, a cam, arms extending from the shafts and bearing on the cam, and means for adjusting the cam angularly.

In testimony that I claim the foregoing as my own, I have hereto affixed my signature in the presence of two witnesses.

WILLIAM R. MARTIN.

Witnesses:
  F. R. BECKER,
  ADAM SAUER.